United States Patent
Kelton et al.

(10) Patent No.: US 11,823,216 B2
(45) Date of Patent: Nov. 21, 2023

(54) CLASSIFYING BEHAVIOR THROUGH SYSTEM-GENERATED TIMELINES AND DEEP LEARNING

(71) Applicant: International Business Machines Corporation, Armonk, NY (US)

(72) Inventors: Eugene I. Kelton, Mechanicsburg, PA (US); Brandon Harris, Union City, NJ (US); Willie R. Patten, Jr., Hurdle Mills, NC (US); Eliza Salkeld, Raleigh, NC (US); Russell Gregory Lambert, Wake Forest, NC (US); Yi-Hui Ma, Mechanicsburg, PA (US); Shuyan Lu, Durham, NC (US); Shanna Hayes, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/867,355

(22) Filed: May 5, 2020

(65) Prior Publication Data

US 2021/0350487 A1    Nov. 11, 2021

(51) Int. Cl.
| | | |
|---|---|---|
| *G06Q 30/02* | (2023.01) | |
| *G06Q 30/0201* | (2023.01) | |
| *G06Q 50/26* | (2012.01) | |
| *G06Q 20/40* | (2012.01) | |
| *G06V 10/764* | (2022.01) | |

(52) U.S. Cl.
CPC ..... *G06Q 30/0201* (2013.01); *G06Q 20/4016* (2013.01); *G06Q 50/265* (2013.01); *G06V 10/764* (2022.01)

(58) Field of Classification Search
None
See application file for complete search history.

(56) References Cited

U.S. PATENT DOCUMENTS

| | | | | |
|---|---|---|---|---|
| 8,611,867 B2 * | 12/2013 | Swanburg | ............. | H04L 67/306 |
| | | | | 455/414.1 |
| 8,773,436 B1 * | 7/2014 | Hao | ...................... | G06T 11/206 |
| | | | | 345/440.2 |

(Continued)

OTHER PUBLICATIONS

Chen, Zhiyuan, et al., "Machine Learning Techniques for Anti-Money Laundering (AML) Solutions in Suspicious Transaction Detection: a Review," Knowledge and Information Systems, v. 57, n. 2, pp. 245-285 (2018).

(Continued)

*Primary Examiner* — William J Jacob
(74) *Attorney, Agent, or Firm* — Gavin Giraud

(57) ABSTRACT

Computer vision and deep learning techniques are leveraged to detect behavior patterns in transaction histories. A transaction timeline is built for a series of transactions, e.g., financial, and a graphic image is constructed representing the transaction timeline. The graphic image is then matched to a known behavior pattern using a cognitive system. The cognitive system is trained with historical timeline images having associated labels. In one example the graphic image is a bar chart and each financial transaction is represented as a bar in the bar chart having a height proportional to a transaction amount, the bar being located along a time axis of the bar chart according to the transaction date and being color coded according to the transaction type.

14 Claims, 7 Drawing Sheets

(56) References Cited

U.S. PATENT DOCUMENTS

| | | | |
|---|---|---|---|
| 10,375,098 B2 | 8/2019 | Oliner et al. | |
| 10,403,270 B1* | 9/2019 | Homewood | G06Q 10/10 |
| 10,642,898 B1* | 5/2020 | Pratt | G06T 19/20 |
| 2001/0051862 A1* | 12/2001 | Ishibashi | H04L 41/147 |
| | | | 703/14 |
| 2005/0219577 A1* | 10/2005 | Edge | H04N 1/603 |
| | | | 358/1.9 |
| 2006/0089837 A1* | 4/2006 | Adar | G06Q 20/04 |
| | | | 705/305 |
| 2007/0022069 A1 | 1/2007 | Goodman | |
| 2010/0100470 A1* | 4/2010 | Buchanan | G06Q 10/10 |
| | | | 705/35 |
| 2010/0171740 A1* | 7/2010 | Andersen | G06T 7/149 |
| | | | 715/848 |
| 2011/0258049 A1* | 10/2011 | Ramer | G06Q 30/0273 |
| | | | 705/14.69 |
| 2013/0191194 A1* | 7/2013 | Shreibati | G06Q 30/0209 |
| | | | 705/14.12 |
| 2014/0038553 A1* | 2/2014 | Gordon | H04L 67/535 |
| | | | 455/410 |
| 2014/0081652 A1* | 3/2014 | Klindworth | G06Q 10/0635 |
| | | | 705/2 |
| 2015/0339689 A1* | 11/2015 | Chen | G06Q 30/0282 |
| | | | 705/7.34 |
| 2016/0292589 A1* | 10/2016 | Taylor, Jr. | G06T 9/002 |
| 2016/0379132 A1 | 12/2016 | Jin | |
| 2017/0061625 A1* | 3/2017 | Estrada | G06T 7/75 |
| 2017/0330075 A1 | 11/2017 | Tuysuzoglu | |
| 2018/0005419 A1* | 1/2018 | Hao | G06T 5/002 |
| 2018/0040064 A1* | 2/2018 | Grigg | G06Q 30/0244 |
| 2018/0253865 A1* | 9/2018 | Price | G06T 7/194 |
| 2018/0276541 A1 | 9/2018 | Studnitzer et al. | |
| 2019/0259033 A1* | 8/2019 | Reddy | G06N 5/02 |
| 2019/0340614 A1 | 11/2019 | Hanis | |
| 2020/0193408 A1* | 6/2020 | Hadley | G06Q 20/3821 |
| 2020/0258144 A1* | 8/2020 | Chaturvedi | G06T 7/50 |
| 2021/0279475 A1* | 9/2021 | Tusch | H04L 63/0861 |

OTHER PUBLICATIONS

Chollet, François, "Basic classification: Classify images of clothing", TensorFlow [online], retrieved on May 5, 2020 from the Internet URL: https://www.tensorflow.org/tutorials/keras/classification (2017).

Sim, Hyun, et al., "Is Deep Learning for Image Recognition Applicable to Stock Market Prediction?", Hindawi [online], v. 2019 article ID 4324878, retrieved on Apr. 3, 2020 from the Internet URL: https://www.hindawi.com/journals/complexity/2019/4324878/ (2019).

Suzumura, Toyotaro, et al., "Towards Federated Graph Learning for Collaborative Financial Crimes Detection", Cornell University arXiv, preprint arXiv:1909.12946 (2019).

Dasgupta et al., "Hierarchical Sampling for Active Learning," In Proceedings of the 25th international conference on Machine learning (ICML '08). ACM, pp. 208-215, 2008.

Guan et al., "Improving supervised learning performance by using fuzzy clustering method to select training data." Journal of Intelligent & Fuzzy Systems, IOS Press, 19 (2008) 321-334.

Hanis et al., "Cognitive Methodology for Sequence of Events Patterns in Fraud Detection Using Petri-Net Models," Application and Drawings, Filed on May 4, 2018, 33 Pages, U.S. Appl. No. 15/971,943.

Hu et al., "Off to a Good Start: Using Clustering to Select the Initial Training Set in Active Learning," AAAI Publications, 23rd International FLAIRS Conf. www.aaai.org/ocs/index.php/FLAIRS/2010/paper/viewPaper/1305, pp. 26-31.

Ienco et al., "Clustering Based Active Learning for Evolving Data Streams." In: Fürnkranz J., Hüllermeier E., Higuchi T. (eds) Discovery Science. DS 2013. Lecture Notes in Computer Science, vol. 8140. Springer, pp. 79-93, 2013.

Krueger et al., "Facetto: Combining Unsupervised and Supervised Learning for Hierarchical Phenotype Analysis in Multi-Channel Image Data." bioRxiv 722918, https://www.biorxiv.org/content/10.1101/722918v1, 11 pages.

Mell et al., "The NIST Definition of Cloud Computing", National Institute of Standards and Technology, Special Publication 800-145, Sep. 2011, 7 pages.

Nguyen et al., "Active learning using pre-clustering." In Proceedings of the twenty-first international conference on Machine learning (ICML '04). ACM, 2004, 8 pages.

Peikari et al., "A Cluster-then-label Semi-supervised Learning Approach for Pathology Image Classification," Scientific Reports, (2018) 8:7193, DOI:10.1038/s41598-018-24876-0, 13 pages.

Tensorflow, "Basic classification: Classify images of clothing," [accessed Jan. 13, 2021], Retrieved from the Internet: <https://www.tensorflow.org/tutorials/keras/classification>, 11pages.

Varghese, "Image clustering using Transfer learning," Towards Data Science, Feb. 2, 2019, [accessed Jan. 13, 2021], Retrieved from the Internet: <https://towardsdatascience.com/image-clustering-using-transfer-learning-df5862779571>, 7 pages.

Wong, "Building a Similar Images Finder without any training!" Towards Data Science, Dec. 15, 2017, [accessed Jan. 13, 2021], Retrieved from the Internet: <https://towardsdatascience.com/building-a-similar-images-finder-without-any-training-f69c0db900b5>, 5 pages.

Patten et al., "Labeling Optimization Through Image Clustering", U.S. Appl. No. 17/147,595, filed Jan. 12, 2021.

Appendix P—List of IBM Patents or Patent Applications Treated as Related, Filed herewith, 2 Pages.

* cited by examiner

CLASSIFYING BEHAVIOR THROUGH SYSTEM-GENERATED TIMELINES AND DEEP LEARNING

BACKGROUND OF THE INVENTION

Field of the Invention

The present invention generally relates to detection of behavior patterns, and more particularly to a method of labeling a particular transaction history, such as financial transactions, with a known behavioral pattern.

Description of the Related Art

Predicting human behavior can be extremely difficult, but it can also be very useful for a wide variety of purposes such as business, financial, and law enforcement. One example that spans all of these areas is fraud detection. Fraud detection has become a special form of technology. Some of the most common applications of fraud detection are for credit card fraud, bank fraud, medical fraud, welfare fraud, and insurance fraud. The stakes in these areas are extremely high. A recent study showed that merchants in the United States alone lost nearly 200 billion dollars in a single year to credit card fraud.

Fraud appears in many different forms and the detection of fraud relies on a system with the capability to recognize or discover these fraudulent activities/events. Events occur within time and space, usually at predictable occurrences. This allows traditional fraud detection logic to build fixed rules according to the particular circumstances to recognize potential fraud and flag it for further review.

More advanced approaches to fraud detection involve cognitive technology. A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network made up of neurons that have learnable weights and biases.

There are alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables.

A cognitive system is not limited to the use of a single approach, i.e., it can incorporate any number of these machine learning algorithms. These algorithms can produce a score or confidence value indicating the likelihood that a particular answer is correct.

SUMMARY OF THE INVENTION

The present invention in at least one embodiment is generally directed to a method of detecting a financial behavior pattern of an entity by receiving current financial transaction information for a plurality of financial transactions of the entity occurring over a period of time, building a transaction timeline for the plurality of financial transactions, constructing a graphic image from the financial transaction information visually representing the transaction timeline, and matching the graphic image to a particular one of a plurality of known behavior patterns. The matching can be performed by a cognitive system trained with historical timeline images for respective historical transaction timelines, each historical timeline image having an associated label, where the particular known behavior pattern is one of the labels. The cognitive system can further use metadata associated with the transaction timeline such as annotations regarding the financial transactions. In one example the graphic image is a bar chart and each financial transaction is represented as a bar in the bar chart having a height proportional to a transaction amount, the bar being located along a time axis of the bar chart according to a transaction date and having a graphic representation based on a transaction type. The graphic representations can be color coding according to the transaction types. In an illustrative implementation the graphic image has graphic features representing statistical values of the timeline including a minimum transaction value, a maximum transaction value and a median transaction value. For those cases when it is determined that the particular known behavior pattern is malicious, and an action can be automatically performed such as a notification, a denial, or a challenge.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Conventional behavior prediction techniques have become fairly sophisticated in their ability to accurately identify behavior patterns from a person's recent transactions or other events. System designers are, however, continually searching for different ways to model behavior that can provide different perspectives for extracting patterns from the data. One problem in this search is that transaction histories often vary substantially in nature and size, making it hard to find a consistent manner of using the histories to either create the model or apply it.

It would, therefore, be desirable to devise an improved method of identifying a behavior pattern from a series of transactions which could be applied to a variable number of transaction types and sizes over any relevant time frames. It would be further advantageous if the method could allow recognition of behavior patterns using understanding gained other than from the purely numerical nature of conventional transaction analysis. These and other advantages are achieved in various implementations of the present invention by creating a timeline of transactions of a focal object (customers, accounts, etc.), or any measured sequence of events, and converting the data points into annotated images that are labeled to be used in a predictive image recognition deep learning model. Converting the transaction timeline to a graphic image naturally handles the problems associated with variable-size transactions histories, and imparts a special insight to improve the classification of behavioral similarities.

Figure 1:
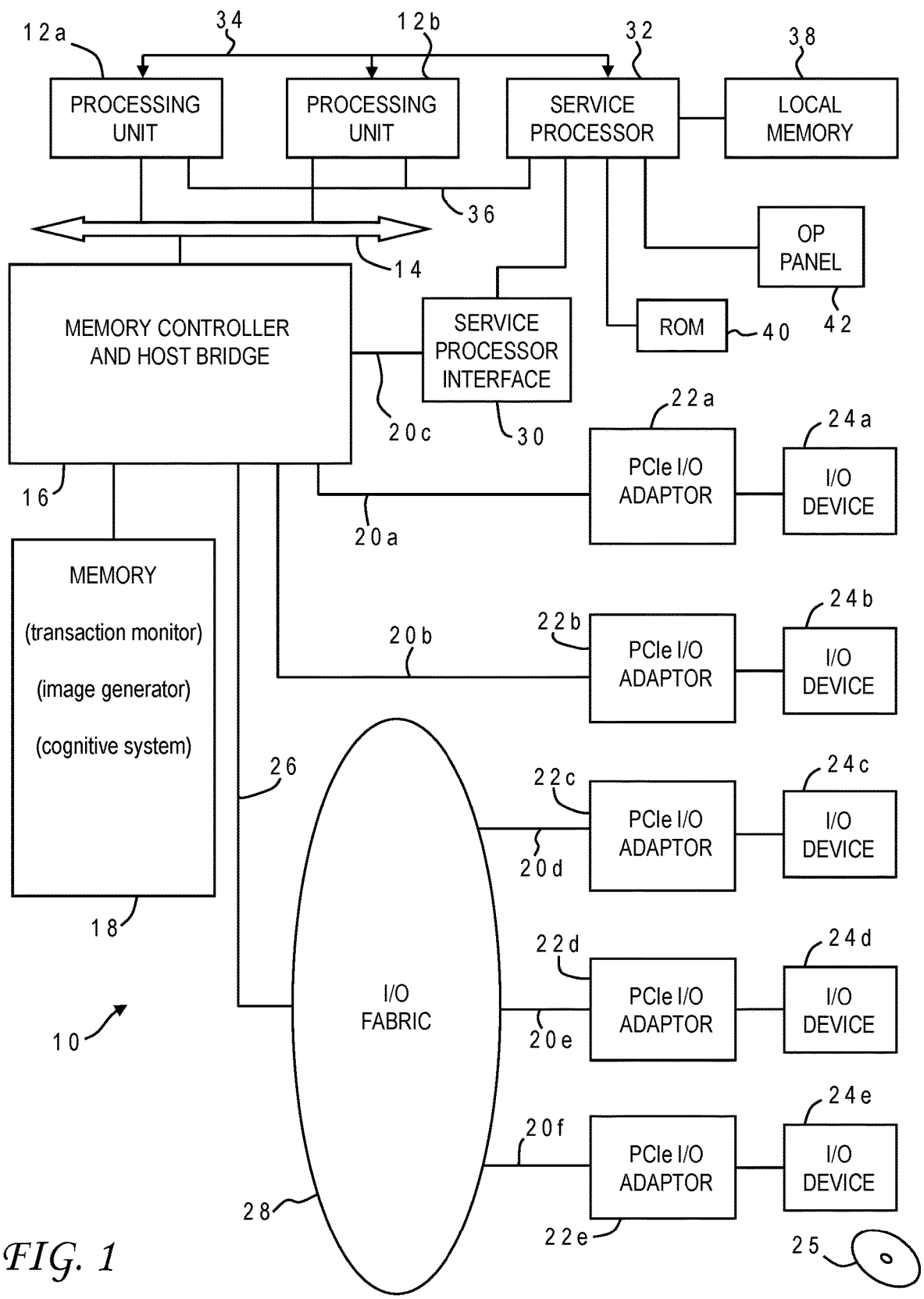
FIG. 1 is a block diagram of a computer system programmed to carry out detection of behavior patterns from a transaction timeline in accordance with one implementation of the present invention.

With reference now to the figures, and in particular with reference to FIG. 1, there is depicted one embodiment 10 of a computer system in which the present invention may be implemented to carry out detection of behavior patterns from a series of transactions. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention including a transaction monitor, an image generator that generates an image for a timeline of the transactions, and a cognitive system that analyzes the image.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the behavior pattern detection program of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a behavior pattern detection process that uses a novel approach for analyzing a series of transactions which involves a cognitive system. Accordingly, a program embodying the invention may additionally include conventional aspects of cognitive technology, and these details will become apparent to those skilled in the art upon reference to this disclosure.

Figure 2:
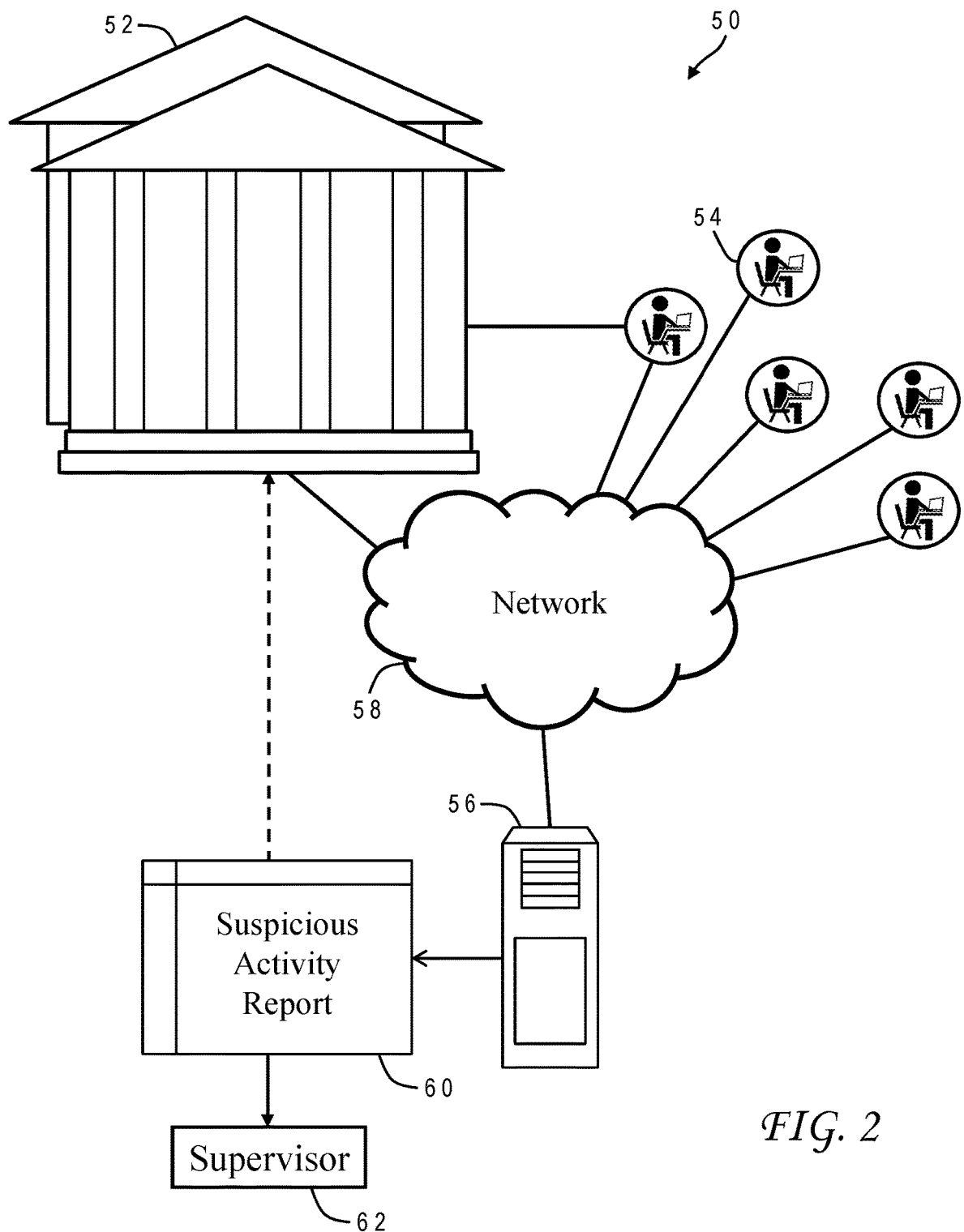
FIG. 2 is a pictorial representation of a financial transaction monitoring system in accordance with one implementation of the present invention including one or more financial institutions, multiple customers and a cloud server which all communicate over a network such as the Internet.

Referring now to FIG. 2, there is depicted a financial transaction monitoring system 50 in accordance with one implementation of the present invention including one or more financial institutions 52, multiple customers 54 and a cloud server 56 which all communicate over a network 58 such as the Internet. Cloud server 56 may have any conventional architecture, such as that of computer system 10. It is to be understood that although this disclosure refers to cloud computing, implementation of the teachings recited herein are not limited to a cloud computing environment. Rather, embodiments of the present invention are capable of being implemented in conjunction with any other type of computing environment now known or later developed.

A computer system associated with a financial institution 52 creates records of financial transactions of customers 54 using conventional means. The financial institution computer system may be local to a physical presence of the institution or may be remote, such as another server available via network 58. The customers may interface with the financial institutions' systems by any convenient means such as a desktop or laptop computer, or a mobile computing device such as a cellphone. A customer may be an individual or may be a legal entity such as a company, or even a department of one of the financial institutions. The nature of the transactions may vary considerably depending on the specific application. An exemplary application is for a banking institution, where a customer has a checking or savings account. These details should not, however, be considered limiting as the present invention can be implemented for any type of transactions or accounts.

A transaction history can thus be created over a period of time for a given customer's dealings with one of the institutions, or aggregated from multiple institutions a single customer is transacting business with. The relevant period of time may vary considerably (days, months or years) according to designer preferences, expert input or time frames associated with particular transaction types. In the illustrative implementation, each transaction (event) has transaction information including at least a transaction amount, a transaction date, and a transaction type. As explained further below, cloud server 56 analyzes the transaction history to see if it can be associated with any identifiable behavior patterns. This analysis includes generation of a graphic image representing a timeline for the transaction history. The graphic image is submitted to a cognitive system running on cloud server 56 which provides one or more output labels for the graphic image, the labels being the known behavior patterns. If the cognitive system returns a label that indicates potential problems with the customer/account (e.g., fraud), appropriate action can be taken, such as generating a suspicious activity report 60. Suspicious activity report 60 is provided to a system supervisor 62 and may also be transmitted to the particular financial institution involved. Supervisor 62 can decide whether to escalate the matter. In some implementations, responsive actions can automatically be taken by the system based on the alert.

Figure 3A:
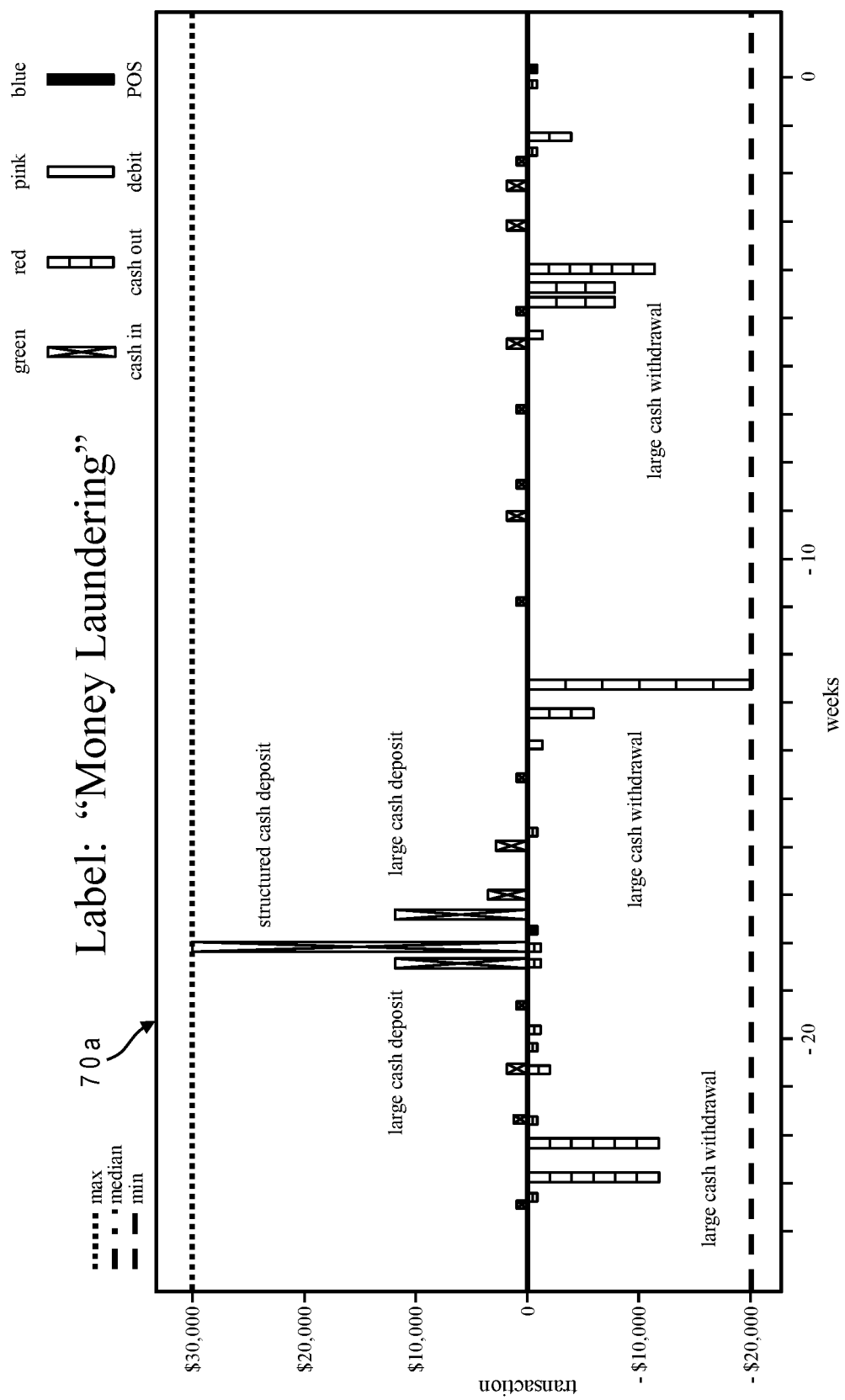
FIGS. 3A and 3B are bar charts forming graphic (color) images for two different example transaction timelines with respective labels used for training a cognitive system in accordance with one implementation of the present invention.
Figure 3B:
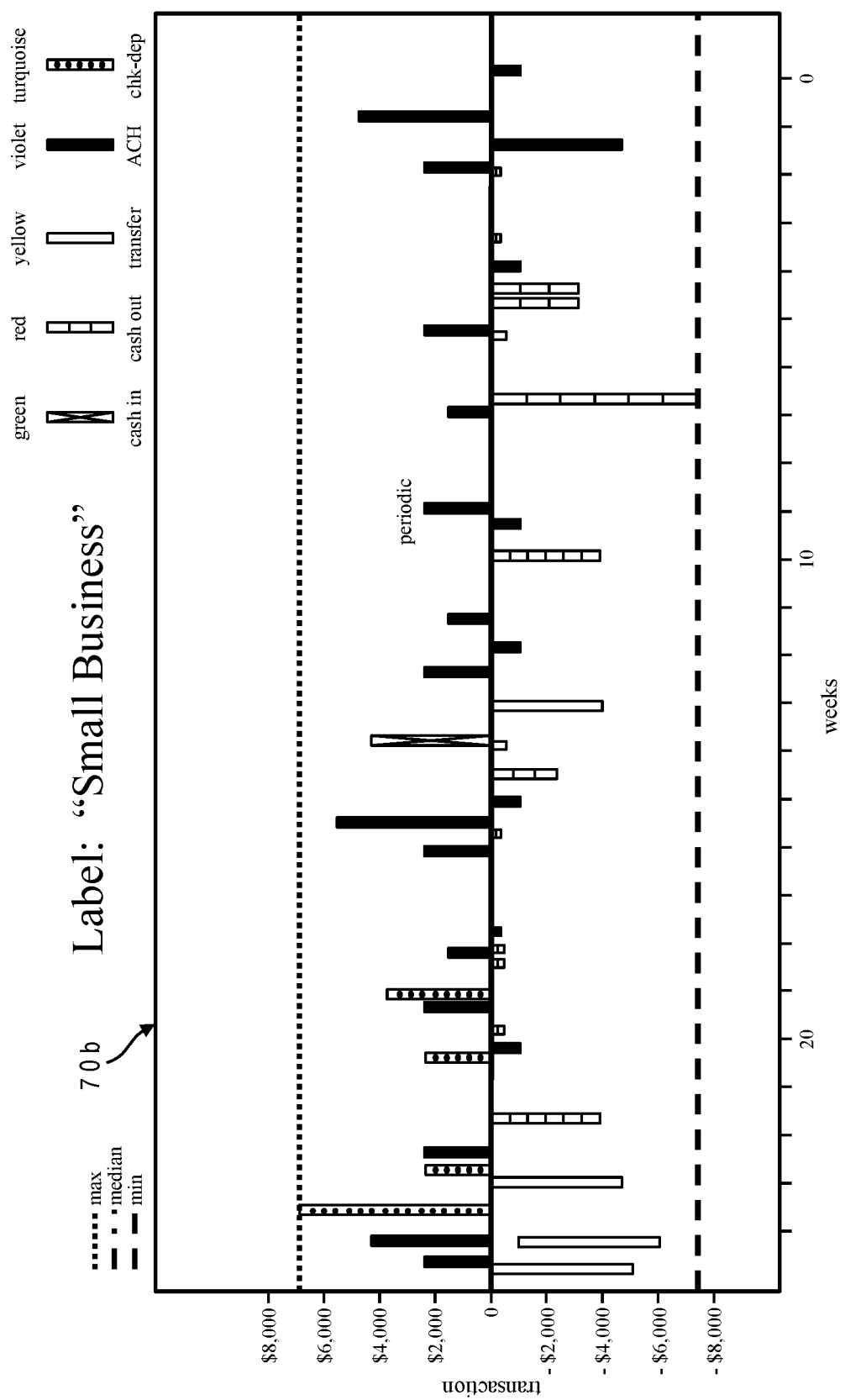

Advanced cognitive systems are often able to detect patterns in various data that humans fail to recognize. The present invention takes advantage of this ability by providing a novel technique for presenting the transaction information that leverages computer vision. Computer vision is a field of artificial intelligence that trains computers to interpret and understand the visual world. Conventional methods for transaction analysis such as fraud detection rely on numerical and textual approaches. The present invention instead uses a graphical approach where the transaction history is visually represented as an image. A timeline of transaction events is created from the transaction history, and this timeline is translated into a chart, graph or pictorial diagram, preferably one with colors. In the illustrative implementation, the image is a bar chart. FIGS. 3A and 3B show exemplary bar charts 70a, 70b representing transaction timelines for two different transaction histories. Each transaction is represented by a bar having a height that is proportional to the amount involved in the transaction (i.e., dollars) and having a particular color representing a transaction type for the transaction. In these bar charts, credits appear as positive values and debits appear as negative values but (due to the color coding) this is not necessary, i.e., a bar chart could show both credits and debits along the same direction. The bars are positioned according to the transaction dates, expressed here as the number of days that have passed since the transaction occurred. The scale of the time axis for these charts is weeks.

Further to the example of FIG. 3A, bar chart 70a shows four types of transactions carried out by the first customer or other entity during the relevant time period. These are cash deposits ("cash in"), cash withdrawals ("cash out"), signature debit card transactions ("debit") and point-of-sale transactions ("POS"). Each transaction type is assigned its own color. Cash deposits are green, cash withdrawals are red, signature debit card transactions are pink, and point-of-sale transactions are blue. Bar chart 70a can have other graphic features relating to the transactions, in particular indications of statistical values associated with the timeline transactions such as a minimum transaction value, a maximum transaction value and a median transaction value. These values are represented as black patterned lines (solid, dashed, dotted) but they could alternatively be color-coded as well. They are just one more example of how numeric information could be converted into image representations for the cognitive analysis. The cognitive analysis may also rely on other (non-graphic) information for some implementations. This information may be in the form of various metadata associated with the timeline. Bar chart 70a can include annotations for any of the transactions. In FIG. 3A, those annotations are "large cash withdrawal" (three instances), "large cash deposit" (two instances), and "structured cash deposit" (one instance).

Bar chart 70a also has a label of "Money Laundering". This label is not part of the graphic image itself but is associated with the image. In the setting where bar chart 70a represents training data for the cognitive system, the label is provided by a subject matter expert who has reviewed information relating to this transaction history and has concluded that it represents illicit activity. Alternatively, in the setting where bar chart 70a is an input for analysis by the cognitive system during operation, the label is assigned by the cognitive system to classify the predicted behavior.

FIG. 3B shows a similarly designed bar chart 70b for a different set of transactions by another entity. Bar chart 70b has five types of transactions that were carried out by the second customer during the relevant time period. These are cash deposits ("cash in"), cash withdrawals ("cash out"), in-bank transfers ("transfer"), automated clearing house transfers ("ACH") and check deposits ("chk-dep"). Each transaction type is again assigned its own color. As with Figure A, cash deposits are green and cash withdrawals are red; in-bank transfers are yellow, ACH transfers are violet, and check deposits are turquoise. ACH transfers can have either positive or negative values. Bar chart 70b also has the indications for the minimum transaction value, the maximum transaction value and the median transaction value. Bar chart 70b has the label "Small Business", either assigned by an expert (for training data) or computed by the cognitive system (for operative analysis). Notably, the time scale for bar chart 70b is the same as the time scale for bar chart 70a. While this is not mandatory, normalizing the timelines in this manner the timeframe in such a way that variable-size transaction histories become easier to compare.

FIGS. 3A and 3B have been simplified for purposes of explanation, and it will be appreciated that a timeline image could have many more colors and transaction types; the colors can also include shades of gray. The transaction types are essentially unlimited and depend on the particular scenario at hand. Similarly, other charts besides bar charts could be used, such as stacked bar, pie, line, area, or surface. Any translation of a timeline into a graphic image can be used. A wide variety of labels can also be used depending upon the nature of the transactions and the purpose behind the analysis. For example, the cognitive system might be trained to just classify transactions as either "Money Laundering" or "Not Money Laundering" for the banking industry, or as either "Fraud" or "Not Fraud" in the insurance industry. Other labels might include "Student", "International Student", "Shell Company", "Hospital", "Large Corporation", "Casino" or other business types. All of these labels are exemplary and should not be construed in a limiting sense as any behavior type or entity classification can be used.

Figure 4:
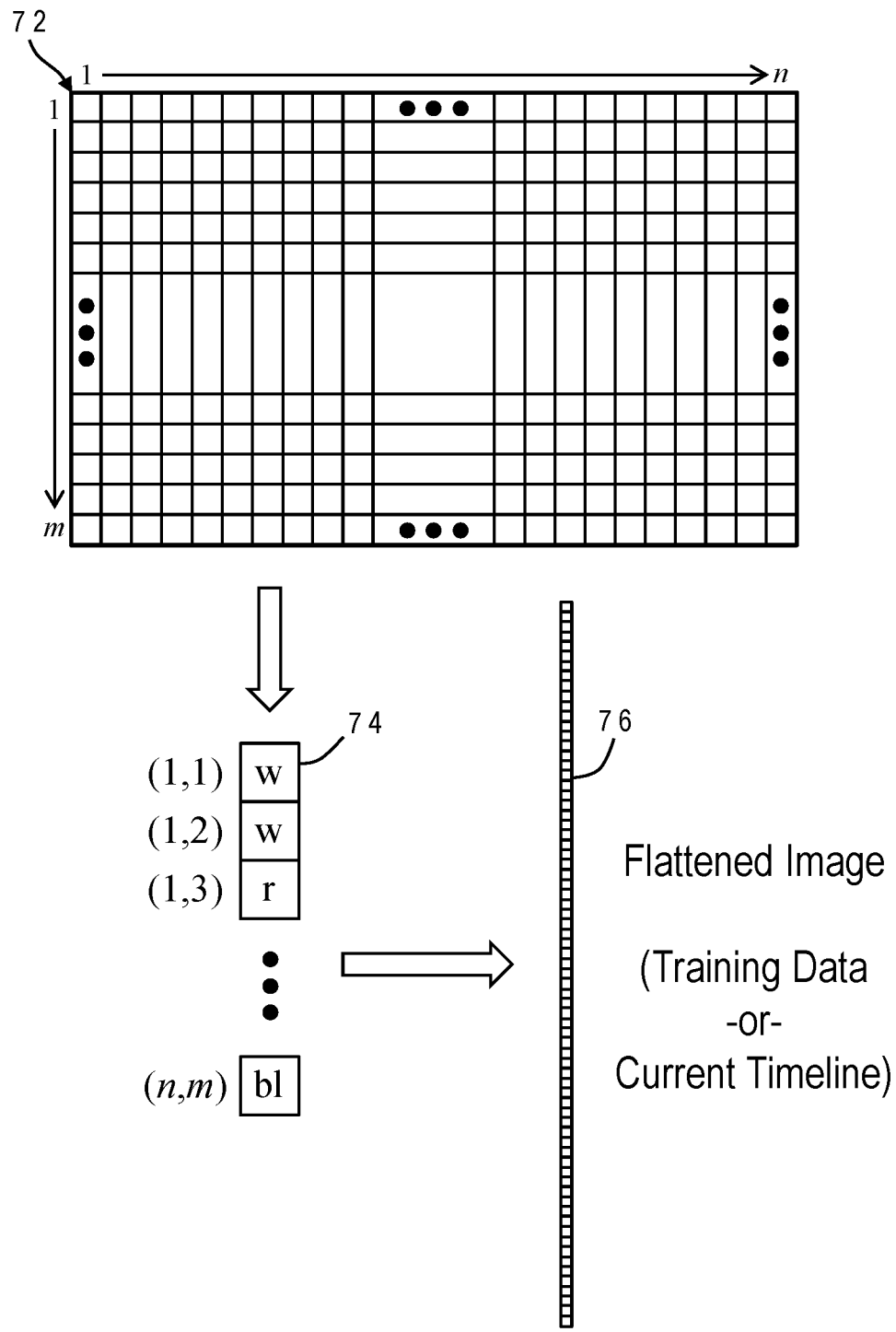
FIG. 4 is a pictorial representation illustrating how a bitmap of a graphic image for a transaction timeline is flattened for use with cognitive system in accordance with one implementation of the present invention.

Once the graphic image representing the timeline has been created, there are many ways to convert that image to an acceptable format as an input for the cognitive system. For example, the image can be converted into a bitmap 72 having a grid of pixels 74 as seen in FIG. 4. The resolution of the bitmap is a matter of system design, so it can vary depending upon the circumstances. The resolution can be based on the granularity of the timeline, e.g., the pixel size (width) being less than the smallest time increment as seen in the image. The bitmap then undergoes a procedure known as flattening. In that procedure, the grid is broken down into a series of rows or columns, and then those rows or columns are concatenated to form a one-dimensional array 76. In other words, if the bitmap is a grid of n by m pixels, then array 76 will be (n×m) in length, i.e., the first element of the array is pixel (1,1) and the last element in the array is pixel (n,m). Each element has a color value representing the color of that pixel, e.g., "w" equals white, "r" equals red, "bl" equals black, etc. The colors may correspond to a single integer value assigned by convention, or may be a combination of values such as a red/green/blue triad. Array 76 is then used as the training data for the cognitive system. The same conversion procedure is applied to each image used as training data. Likewise, when the cognitive system is used to classify a current transaction timeline, the image for that timeline undergoes the same conversion procedure, and the color values for each pixel are respectively loaded into the input nodes of the cognitive system network for operational analysis.

Figure 5:
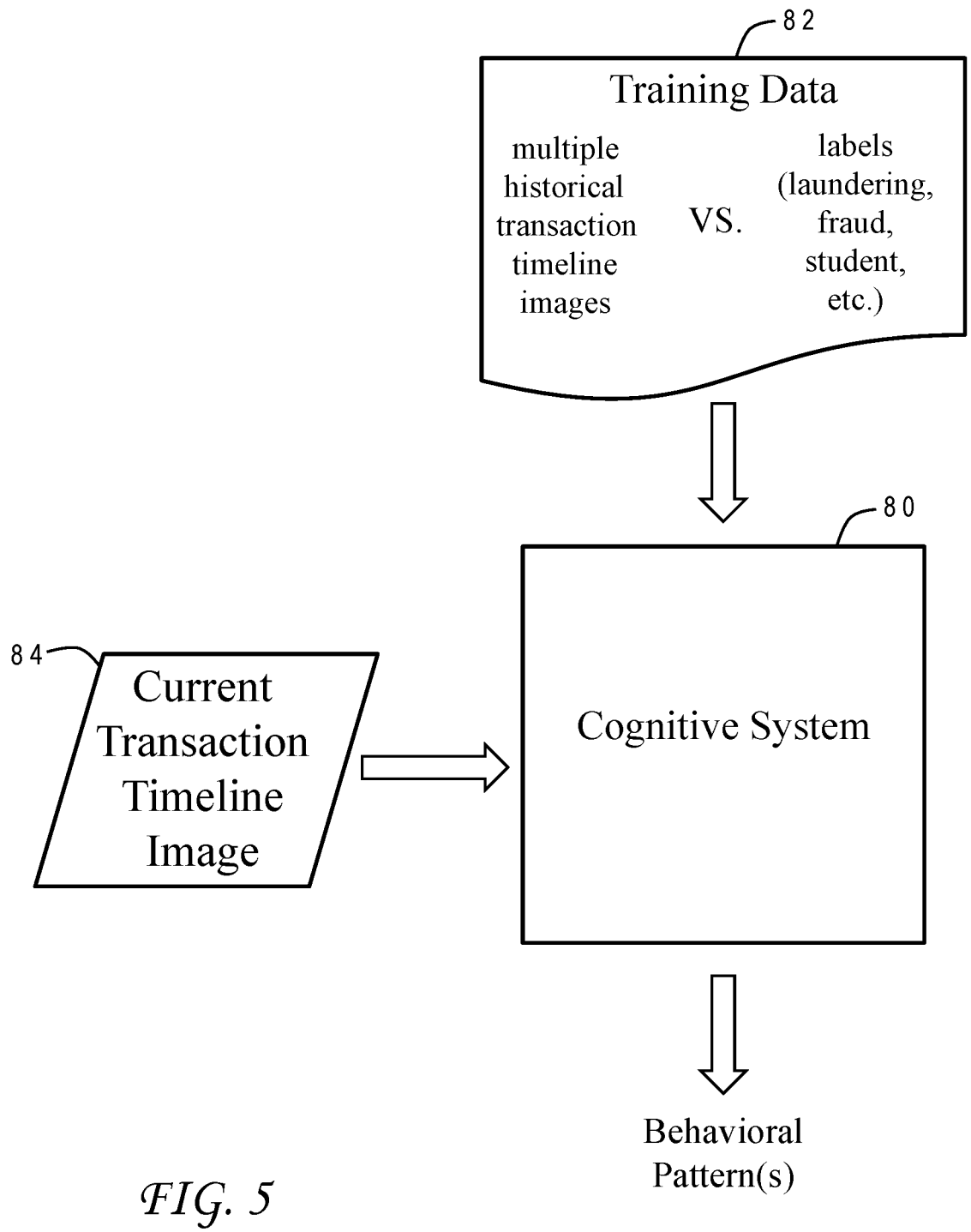
FIG. 5 is a block diagram of a cognitive system used to predict a behavior pattern based on a transaction timeline in accordance with one implementation of the present invention.

FIG. 5 shows operation of a cognitive system 80 in accordance with the illustrative implementation. Cognitive system 80 is programmed by the training data 82 consisting of a very large number of historical timeline images (i.e., like flattened array 76) having respective labels. As noted above, training data 82 is tailored for the particular application in mind. Once so trained, cognitive system 80 is able to predict behavior patterns. A current transaction timeline image 84 is fed to cognitive system 80. Current transaction timeline image 84 is same type of image as the training images, e.g., a bar chart like those seen in FIGS. 3A and 3B, with the same color coding, and undergoes the same flattening procedure. Current transaction timeline image 84 is also preferably normalized as discussed above. Cognitive system 80 will then output a label for the current transaction timeline image 84, i.e., the label is the behavior pattern for this transaction timeline. Cognitive system 80 may use additional information as part of the cognitive analysis besides the image, like metadata such as annotations. In some embodiments, the label can be presented with a confidence value or score indicating the likelihood computed by cognitive system 80 that the label properly matches the transaction timeline. For those situations where the confidence value is not particularly high, cognitive system 80 can present multiple labels with respective confidence values to let the supervisor see what other options are likely.

Figure 6:
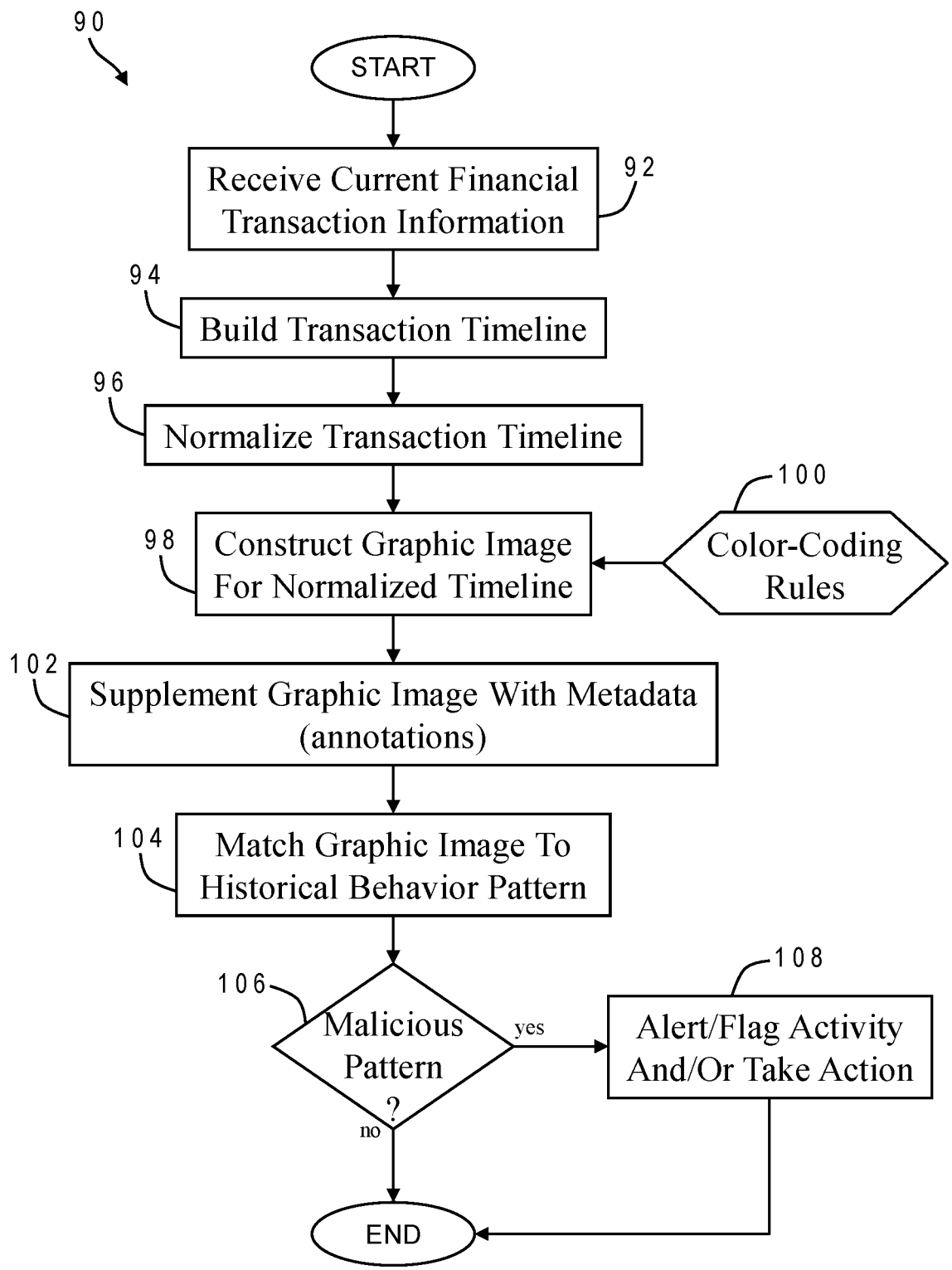
FIG. 6 is a chart illustrating the logical flow for a behavior pattern detecting process in accordance with one implementation of the present invention.

The present invention may be further understood by reference to the chart of FIG. 6 which shows the logical flow for a behavior pattern detecting process 90 in accordance with one implementation of the present invention. Process 90, which may be carried out on cloud server 56, begins by receiving current financial transaction information of a customer of a financial institution 92. The transaction information has been accumulated over a sufficiently long period of time to enable a substantive transaction history, i.e., at least a couple of weeks, possibly months or even a year. The system then builds a transaction timeline from the transaction history 94. The transaction timeline is normalized according to the particular parameters set for this system 96. As noted above, normalizing can include fixing the timeline to a common time scale. If the current timeline is unusually short then blank space can be added to fill in the relevant time period, or if the current timeline is longer than necessary it can be cropped. A graphic image for the normalized timeline is constructed 98. This construction adheres to the particular color-coding scheme used in training the cognitive system, i.e., the same color-coding rules 100 used to generate the training image samples. The graphic image can be supplemented with metadata as desired 102. The graphic image is then matched to a historical behavior pattern by submitting it to the cognitive system 104. If the detected behavior pattern is malicious 106, an alert/flag of the transaction activity can be sent to a supervisor, or other actions taken 108. The actions could include, among other things, a notification (suspicious activity reporting), a denial of privileges (e.g., suspending a credit card account), or a challenge (e.g., sending a text message to a mobile electronic device associated with an owner of an account). The system could also provide a mechanism in the user interface to allow the supervisor or other system engineer to use the current graphic image with an assigned label for additional training, i.e., to update the cognitive system. The assigned label could be restricted to a list of known behavioral patterns or could be a new label if the supervisor is given appropriate system authority.

The present invention thereby provides an effective alternative for detecting behavior patterns in a series of transactions or events. This approach is deemed superior over other supervised machine learning mechanisms for many cases. Conversion of the transaction timeline into a graphic image also inherently resolves limitations that arise in typical numeric-based models. In addition, by coupling the graphic image with optional scaling (either local or global), the system is able to account for variable size transactions to better see the expression of behavior patterns.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with reference to financial institutions and particularly banking, but it is not so limited and could be applied to any transaction type that is relevant to express patterns in the data. In an insurance scenario, the transaction types could include call types (policy check, claim check, etc.) with the transaction amount being a volume in minutes of time discussed, or claim bills types (body shops, medical procedures, etc.) with volume in dollar values. It is therefore contemplated that such modifications can be made without departing from the spirit or scope of the present invention as defined in the appended claims.

What is claimed is:

1. A method of detecting a financial behavior pattern of an entity comprising:
    training a cognitive system using training image samples comprising pixels of various colors without numerical and textual information, wherein the colors are assigned based on color-coding rules and labels representative of behavior patterns, wherein the cognitive system comprises a system memory configured to communicate with a combined memory controller/host bridge and comprising connections and nodes organized to perform computer vision;
    receiving numerical and textual current financial transaction information for a plurality of financial transactions of the entity occurring over a period of time;
    building a transaction timeline for the plurality of financial transactions;
    constructing a graphic image from the financial transaction information visually representing the transaction timeline, wherein constructing the graphic image comprises converting the numerical and textual financial transaction information into pixels using the color-coding rules, wherein the graphic image is converted from a bar chart and each financial transaction is represented as a bar in the bar chart having a height proportional to a transaction amount, the bar being located along a time axis of the bar chart according to a transaction date and having a graphic representation of a color based on a transaction type; and
    matching the graphic image to one of the behavior patterns using the cognitive system.

2. The method of claim 1 wherein the cognitive system is trained with historical timeline images for respective historical transaction timelines, each historical timeline image having an associated label, and the particular known behavior pattern is one of the labels.

3. The method of claim 2 wherein the cognitive system further uses metadata associated with the transaction timeline for said matching, the metadata including one or more annotations regarding the financial transactions.

4. The method of claim 1 wherein the graphic image has graphic features representing statistical values of the timeline including at least a minimum transaction value, a maximum transaction value and a median transaction value.

5. The method of claim 1 further comprising:
    determining that the particular behavior pattern is malicious; and
    automatically performing an action selected from a group consisting of a notification, a denial, and a challenge.

6. A computer system comprising:
    one or more processors which process program instructions;
    a memory device connected to said one or more processors and storing a cognitive system configured to communicate with a combined memory controller/host bridge and comprising connections and nodes organized to perform computer vision; and
    program instructions residing in said memory device for detecting a financial behavior pattern of an entity by:
        training the cognitive system using training image samples comprising pixels of various colors without numerical and textual information, wherein the colors are assigned based on color-coding rules and labels representative of behavior patterns;
        receiving numerical and textual current financial transaction information for a plurality of financial transactions of the entity occurring over a period of time;
        building a transaction timeline for the plurality of financial transactions; and
        constructing a graphic image from the financial transaction information visually representing the transaction timeline, wherein constructing the graphic image comprises converting the numerical and textual financial transaction information into pixels using the color-coding rules, wherein the graphic image is converted from a bar chart and each financial transaction is represented as a bar in the bar chart having a height proportional to a transaction amount, the bar being located along a time axis of the bar chart according to a transaction date and having a graphic representation of a color based on a transaction type; and
        matching the graphic image to one of the behavior patterns using the cognitive system.

7. The computer system of claim 6 wherein the cognitive system is trained with historical timeline images for respective historical transaction timelines, each historical timeline image having an associated label, and the particular known behavior pattern is one of the labels.

8. The computer system of claim 7 wherein the cognitive system further uses metadata associated with the transaction timeline for the matching, the metadata including one or more annotations regarding the financial transactions.

9. The computer system of claim 6 wherein the graphic image has graphic features representing statistical values of the timeline including at least a minimum transaction value, a maximum transaction value and a median transaction value.

10. The computer system of claim 6 wherein said program instructions further determine that the particular known behavior pattern is malicious, and automatically perform an action selected from a group consisting of a notification, a denial, and a challenge.

11. A computer program product comprising:
    one or more non-transitory computer-usable storage media having computer executable instructions stored on the one or more computer-usable storage memory device, the program instructions comprising:
        program instructions to detect a financial behavior pattern of an entity by:
            training a cognitive system using training image samples comprising pixels of various colors without numerical and textual information, wherein the colors are assigned based on color-coding rules and labels representative of behavior patterns, wherein the cognitive system comprises a system memory configured to communicate with a combined memory controller/host bridge and comprising connections and nodes organized to perform computer vision;

receiving numerical and textual current financial transaction information for a plurality of financial transactions of the entity occurring over a period of time;

program instructions to build a transaction timeline for the plurality of financial transactions;

program instructions to construct a graphic image from the financial transaction information visually representing the transaction timeline, wherein constructing the graphic image comprises converting the numerical and textual financial transaction information into pixels using the color-coding rules, wherein the graphic image is converted from a bar chart and each financial transaction is represented as a bar in the bar chart having a height proportional to a transaction amount, the bar being located along a time axis of the bar chart according to a transaction date and having a graphic representation of a color based on a transaction type; and program instructions to match the graphic image to a particular one of a plurality of known behavior patterns.

12. The computer program product of claim 11 wherein the cognitive system is trained with historical timeline images for respective historical transaction timelines, each historical timeline image having an associated label, and the particular known behavior pattern is one of the labels.

13. The computer program product of claim 12 wherein the cognitive system further uses metadata associated with the transaction timeline for the matching, the metadata including one or more annotations regarding the financial transactions.

14. The computer program product of claim 11 wherein the graphic image has graphic features representing statistical values of the timeline including at least a minimum transaction value, a maximum transaction value and a median transaction value.

* * * * *